(12) United States Patent
Tahara

(10) Patent No.: US 7,984,319 B2
(45) Date of Patent: Jul. 19, 2011

(54) MEMORY BUS SHARED SYSTEM

(75) Inventor: Masayuki Tahara, Yokomama (JP)

(73) Assignee: Texas Instruments Incorporated, Dallas, TX (US)

( * ) Notice: Subject to any disclaimer, the term of this patent is extended or adjusted under 35 U.S.C. 154(b) by 727 days.

(21) Appl. No.: 11/955,664

(22) Filed: Dec. 13, 2007

(65) Prior Publication Data
US 2009/0177909 A1 Jul. 9, 2009

(30) Foreign Application Priority Data

Dec. 13, 2006 (JP) ................................. 2006-336038

(51) Int. Cl.
G06F 1/12 (2006.01)
G06F 13/18 (2006.01)

(52) U.S. Cl. ................... 713/400; 710/305; 711/168

(58) Field of Classification Search .................. 713/400; 711/168; 710/305
See application file for complete search history.

(56) References Cited

U.S. PATENT DOCUMENTS

| 6,625,716 B2 * | 9/2003 | Fackenthal ............ 711/211 |
| 7,185,133 B2 * | 2/2007 | Teranuma et al. ...... 710/309 |
| 7,426,607 B2 * | 9/2008 | Oh ......................... 711/104 |

OTHER PUBLICATIONS

Tim Hellman, "SDRAM interface slashes pin count," design ideas, EDN/Mar. 29, 2001, pp. 132, 134.

* cited by examiner

Primary Examiner — Thuan Du
(74) Attorney, Agent, or Firm — Rose Alyssa Keagy; Wade J. Brady, III; Frederick J. Telecky, Jr.

(57) ABSTRACT

The invention reduces the pin terminal number of a controller that in parallel or simultaneously accesses a synchronous memory and an asynchronous memory. When a column address is latched to an SDRAM, immediately after that, access to FLASH is started, and a shared bus controller outputs the write/read address with respect to FLASH on the address bus. Then, after the end of data transfer on the data bus, either the shared bus controller outputs the write data, or FLASH can output the read data on the data bus by means of a strobe signal. Then, the input of address is established by FLASH, and, as the shared bus controller asserts a strobe signal, either FLASH fetches the write data on the data bus, or the shared bus controller fetches the read data on the data bus.

13 Claims, 15 Drawing Sheets

| SHARING SYSTEM | PRIOR ART | EMBODIMENT 2 | EMBODIMENT 3 | EMBODIMENT 1 |
|---|---|---|---|---|
| REDUCED PIN NUMBER | 0 PINS | 10 PINS | 3 PINS | 19 PINS |
| FLASH BUS ACCESS | 8 BITS | 8 BITS | 16 BITS | 16 BITS |
| ACCESS COMPETITION | NONE | SMALL | SMALL | LARGE |
| SDRAM TRANSFER EFFICIENCY | 44% | (NOT MEASURED) | (NOT MEASURED) | 87% |
| FLASH DATA TRANSFER RATE | 100% | 92% | 184% | 152% |

MEMORY BUS SHARED SYSTEM

FIELD OF THE INVENTION

The present invention pertains to a type of memory system for signal processing and data processing. Especially, the present invention pertains to a type of memory bus shared system that shares a bus for different types of memories.

BACKGROUND OF THE INVENTION

Usually, in digital signal processing, a semiconductor memory is used together with a microprocessor. There are two types of semiconductor memories, that is, a volatile memory and a nonvolatile memory. When both types are used together in a single system, the volatile memory is mainly used for temporary storage of data, while the nonvolatile memory is mainly used for storage of programs and fixed values.

In recent years, with improvement in the processability of microprocessors (MRU), a higher rate is required for the volatile memory, and a large capacity is required for the nonvolatile memory. The main type of high rate volatile memory is a synchronous DRAM (SDRAM), and the main type of large capacity nonvolatile memory is a flash memory.

For example, for a DVD (digital versatile disk) driver, on a printed board for signal processing, together with a semiconductor package of an analog front end (AFE) that has the output signal of the optical pickup input to it and performs analog signal arithmetic operation processing, a semiconductor package of a digital front end (DFE) that performs digital signal processing for optical disk reproduction based on a reproduction data signal from the AFE and digital signal processing for recording on an optical disk based on write data from a personal computer or MPEG encoder/decoder (back end), semiconductor packages of a DRAM and flash memory in company with said DFE are also assembled. Here, in the SDRAM, the data immediately after read from the optical disk and the data immediately before write in the optical disk are temporarily stored. Also, in the flash memory, the programs for operation of MPU in the DFE and the various fixed values (such as the setting values for control acquired with the learning function), etc. are unchangingly stored.

In the prior art, with respect to the DFE, the SDRAM and the flash memory are connected entirely individually or independently. Consequently, for example, when the pin numbers of the SDRAM package and the flash memory package are 35 and 32, respectively, it is necessary to allot a total of 67 pins on the DFE package to the SDRAM and the flash memory. As a result, the pin number of the DFE package is increased, and the size of the package becomes larger. Usually, for a DVD drive substrate, the DFE package is significantly larger than the other packages, and it is the determining factor of the substrate size. As a result, as the DFE package becomes larger, the substrate size becomes larger, and this leads to a larger size of the DVD driver. Also, in the future, device integration of the DFE and AFE (to form a single chip or a single package) is a development direction, and reduction of the pin number of the DFE package remains an urgent task to be addressed.

The objective of the present invention is to solve the aforementioned problems of the prior art by providing a type of memory bus shared system characterized by the fact that it can reduce the pin number of a controller that can access both the synchronous memory and the asynchronous memory in parallel or simultaneously, so that it is possible to realize improvement with respect to the package size, substrate size and the assembly cost.

In addition, an objective of the present invention is to provide a type of memory bus shared system characterized by the fact that by using an optimum protocol with respect to the competition between the synchronous memory and asynchronous memory, it is possible to guarantee the access time without a decrease in the data transfer efficiency and data transfer rate for both memories.

SUMMARY OF THE INVENTION

In order to realize the aforementioned objectives, the first type of memory bus shared system of the present invention is characterized by the following facts: the memory bus shared system has a first memory that performs data write/read in synchronization with a clock, a second memory that performs data write/read asynchronously and independent of a clock, a controller that accesses said first and second memories and controls data write/read, a first address bus that connects said controller and said first memory for address assignment, a first data bus that connects said controller and said first memory for data transfer, a first control line that connects said controller and said first memory for memory control, a second address bus that connects said controller and said second memory for address assignment, a second data bus that connects said controller and said second memory for data transfer, and a second control line that connects said controller and said second memory for memory control; while a portion or all of the address terminals of said controller are connected commonly to said first and second address buses, a portion or all of the data terminals of said controller are connected commonly to said first and second data buses; said controller performs the following operation: when access to said first memory and access to said second memory compete with each other, after a first address sent to said first address bus is fetched to said first memory, a second address is sent to said second address bus; on said first data bus, data transfer with said first memory is terminated; and, after establishment of the input of second address in said second memory, data transfer is performed with said second memory on said second data bus.

In the aforementioned constitution, since the address terminals and data terminals of the controller are shared in address assignment and data transfer with respect to the first and second memories, the pin terminal number of the controller can be reduced significantly. Also, by performing alternate operation without competition or conflict on the same address bus or data bus for the first memory in synchronization with a clock and the asynchronous second memory independent of a clock, it is possible to improve both the data transfer efficiency (bus utilization efficiency) and the data transfer efficiency.

As a preferable embodiment of the present invention, said first memory, said second memory and said controller are carried on individual semiconductor chips, respectively, and are assembled on the same substrate or in a package. In this case, since the controller can be made of a semiconductor package with a lower pin number, it is possible to cut the substrate cost and the assembly cost.

As a preferable embodiment of the present invention, said first memory is a synchronous DRAM, and said second memory is a nonvolatile memory (such as a flash memory).

As a preferable embodiment, said controller performs the following operation: when data are written in said synchronous DRAM in the idle state, at a first time point, an active command and a desired row address are simultaneously sent to said first control line and said first address bus, respectively; then, at a second time point after the passage of a prescribed time since said first time point, a write command and a desired column address are simultaneously sent to said first control line and said first address bus, respectively; and data with a prescribed burst length from said second time point are sent to said first data bus in synchronization with a clock. In addition, said controller sends a precharge command to said first control line at a third time point after the passage of a prescribed time corresponding to said burst length from said second time point.

Also, said controller performs the following operation: when data are read from said synchronous DRAM in the idle state, at a first time point, an active command and a desired row address are simultaneously sent to said first control line and said first address bus, respectively; then, at a second time point after the passage of a prescribed time since said first time point, a read command and a desired column address are simultaneously sent to said first control line and said first address bus, respectively; and, from a third time point after the passage of a preset period of CAS latency from said second time point, data with a preset burst length are fetched from said first data bus in synchronization with a clock. In addition, at a fourth time point after the passage of a prescribed time from said third time point, said controller sends a precharge command to said first control line.

As a preferable embodiment, said controller performs the following operation: during a period when a command not in company with the use of said first address bus and said data bus is sent via said first control line to said synchronous DRAM and said command is executed in said synchronous DRAM, write/read is performed for any data with respect to said second memory via said second address bus, said second data bus, and said second control line.

Also, as a preferable embodiment, said controller performs the following operation: after the end of data transfer to said first data bus, the data written on said second data bus are output; then, a strobe signal for write is output to write said data to said nonvolatile memory.

Also, as a preferable embodiment, said controller performs the following operation: after the end of data transfer to said first data bus, a strobe signal for read is output, the data read on said nonvolatile memory are output to said second data bus, and said read data are fetched from said second data bus.

As a preferable embodiment, said controller performs the following operation: immediately after the end of data transfer on said first data bus, said first and second data buses are set in a high impedance state, and then data transmission/reception is performed on said second data bus.

The second type of memory bus shared system of the present invention is characterized by the following facts: the memory bus shared system has a first memory that performs data write/read in synchronization with a clock, a second memory that performs data write/read asynchronously and independent of a clock, a controller that accesses said first and second memories and controls data write/read, a first address bus that connects said controller and said first memory for address assignment, a first data bus that connects said controller and said first memory for data transfer, a first control line that connects said controller and said first memory for memory control, a second address bus that connects said controller and said second memory for address assignment, a second data bus that connects said controller and said second memory for data transfer, and a second control line that connects said controller and said second memory for memory control; a portion or all of the address terminals of said controller are connected commonly to said first and second address buses; said controller performs the following operation, when access to said first memory and access to said second memory compete with each other, after a first address sent to said first address bus is fetched to said first memory, a second address is sent to said second address bus; data transfer with said first memory on said first data bus and data transfer with said second memory on said second data bus are performed independently.

In the aforementioned constitution, the address terminals of the controller are shared in address assignment with respect to the first and second memories, so that it is possible to reduce the pin terminal number of the controller. Here, the first memory in synchronization with a clock and the asynchronous second memory independent of a clock are in operation alternately without competition or conflict on the same address bus. As a result, it is possible to improve the data transfer efficiency (bus utilization efficiency) and the data transfer rate.

The third type of memory bus shared system of the present invention is characterized by the following facts: the memory bus shared system has a synchronous DRAM that performs data write/read in synchronization with a clock, a flash memory that performs data write/read asynchronously and independent of a clock, a controller that accesses said synchronous DRAM and said flash memory and controls data write/read, a first address bus that connects said controller and said synchronous DRAM for address assignment, a first data bus that connects said controller and said synchronous DRAM for data transfer, a first control line that connects said controller and said synchronous DRAM for memory control, a second address bus that connects said controller and said flash memory for address assignment, a second data bus that connects said controller and said flash memory for data transfer, and a second control line that connects said controller and said flash memory for memory control; a portion or all of the address terminals of said controller are connected commonly to said first and second address buses, while a portion or all of the data terminals of said controller are connected commonly to said first and second data buses; said controller performs the following operation: when access to said synchronous DRAM and access to said flash memory compete with each other, after a first address sent to said first address bus is fetched to said synchronous DRAM, a second address on said second address bus is sent out; from the time point when data transfer in a first burst length corresponding to a portion of the desired write data or read data on said first data bus comes to an end, the memory access operation with respect to said synchronous DRAM is stopped, and instead of this, on said second data bus, data transfer with said flash memory is performed; then, the memory access operation with respect to said synchronous DRAM is restarted, and data transfer of a second burst length corresponding to the remainder of said write data or read data is performed.

In the aforementioned constitution, since the address terminals of the controller are shared in address assignment and data transfer with respect to the synchronous DRAM and flash memory, it is possible to significantly reduce the pin terminal number of the controller. Here, the synchronous DRAM in synchronization with a clock and the asynchronous flash memory independent of a clock are in operation alternately without competition or collision on the same address bus and data bus. Also, even if the burst length of the synchronous DRAM is large, it is possible to execute burst transfer in plural rounds with data access of the flash memory sandwiched between them. As a result, it is possible to further

REFERENCE NUMERALS AND SYMBOLS AS SHOWN IN THE DRAWINGS

In the figures, 10 represents an optical disk, 12 represents an optical pickup unit, 18 represents an analog front end, 18 represents a digital front end, 20 represents a SDRAM (synchronous DRAM), 22 represents a FLASH (flash memory), 23 represents a Motor driver, 24 represents a system MRU, 28 represents a shared bus controller, 32 represents a SDRAM controller.

DESCRIPTION OF THE EMBODIMENTS

For the memory bus shared system of the present invention, with the aforementioned constitution and operation, it is pos-sible to reduce the pin terminal number of the controller that can access the synchronous memory and the asynchronous memory in parallel or simultaneously, so that improvement is possible with respect to the package size, the substrate size, and the assembly cost. As a result, it is possible to improve the data transfer efficiency and data transfer rate of the overall system.

Optimum Embodiment of the Invention

Figure 1:
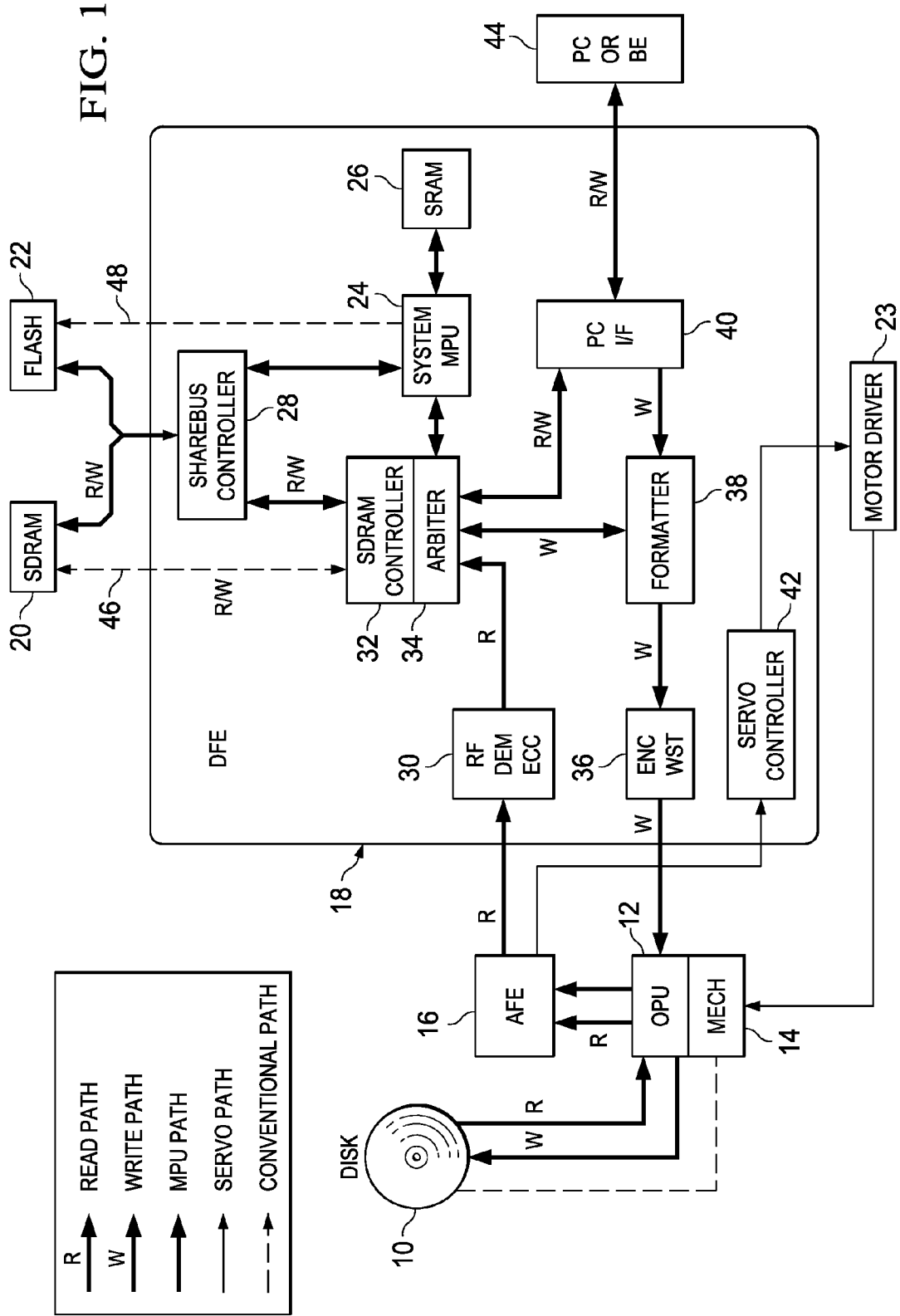
FIG. 1 is a block diagram illustrating the constitution of the DVD driver including the memory bus shared system in an embodiment of the present invention.

In the following, an explanation will be given regarding a preferable embodiment of the present invention with reference to the annexed figures. FIG. 1 is a diagram illustrating the constitution of a DVD driver containing a memory bus shared system in an embodiment of the present invention. This DVD driver is composed of optical disk 10, optical pickup unit (OPU) 12, mechanism portion (MECH) 14, and another optical/driving mechanism, analog front end (AFE) 16, digital front end (DFE) 18, SDRAM (synchronous SDRAM) 20, FLASH (flash memory) 22, motor driver 23, and other electronic circuits. Various parts 16-23 of the electronic circuit are carried as semiconductor chips on individual semiconductor packages, and they are assembled on a single or plural printed boards (not shown in the figure).

DFE 18 has the following parts on one chip or in one package: system MPU 24, SDRAM 26, shared bus controller 28, reproduction signal processing part 30, SDRAM controller 32, arbiter circuit 34, recording signal processing part 36, format processing part 38, PC interface part 40, and servo controller 42.

In the following, an explanation will be given regarding operation of the DVD driver around the signal processing in DFE 18. When the data recorded on optical disk 10 are read and reproduced, while optical disk 10 is driven to rotate at a constant or a variable rate, optical read is performed for the land rows or pit rows on optical disk 10, based on the output signal of OPU 12, AFE 16 performs an amplification and arithmetic operation treatment, so as to generate a reproduction data signal and servo error signal, and these signals are sent to DFE 18.

With DFE 18, reproduction signal processing part 30 receives the reproduction data signal from AFE 16, generates clock (RF), and performs signal processing, such as demodulation/code conversion (DEM), error correction (ECC), etc. The reproduction data output from reproduction signal processing part 30 are sent via arbiter circuit 34 to SDRAM controller 32. Then, the data are temporarily stored (buffered) in SDRAM 20 by means of shared bus controller 28, and are read immediately after that. The reproduction data read from SDRAM 20 are sent via SDRAM controller 32 and arbiter circuit 34 to PC interface part 40, and, from there, the data are sent in ATA protocol to a personal computer (PC), MPEG encoder/decoder or other back end (BE) 44.

Also, the servo error signal from AFE 16 is sent to servo controller 42. Said servo controller 42 is made of, e.g., a DSP (digital signal processor), and it generates various control signals for focusing control and tracking control based on the servo error signal. The control signal generated by servo controller 42 is sent via motor driver 23 to the various parts of mechanical part (MECH) 14, such as a spindle motor, actuator, thread and tray motor, etc.

When data are recorded on optical disk 10, the data from PC or BE 44 are received by PC interface part 40 in ATA protocol, and they are sent via arbiter circuit 34 to SDRAM controller 32, and are temporarily stored (buffered) by shared bus controller 28 in SDRAM 20. Then, shared bus controller 28 reads the data from SDRAM 20, and sends the read data via SDRAM controller 32 and arbiter circuit 34 to format processing part 38. Said format processing part 38 performs format processing, such as error correction coding, ID generation, etc. according to the DVD recording format. Then, recording signal processing part 36 performs encoding conversion (ENC) and write pulse control (WST), and sends the write signal on optical disk 10 to a laser driver in OPU 12.

Control (system control) of the series of operations in the aforementioned data reproduction processing and data recording processing is performed by system MPU 24 in DFE 18. The program that defines the processing operation of system MPU 24 is stored in SDRAM 26 and FLASH 22. Said system MPU 24 directly reads the desired program from SDRAM 26, and performs indirect read from FLASH 22 via shared bus controller 28.

Figure 2:
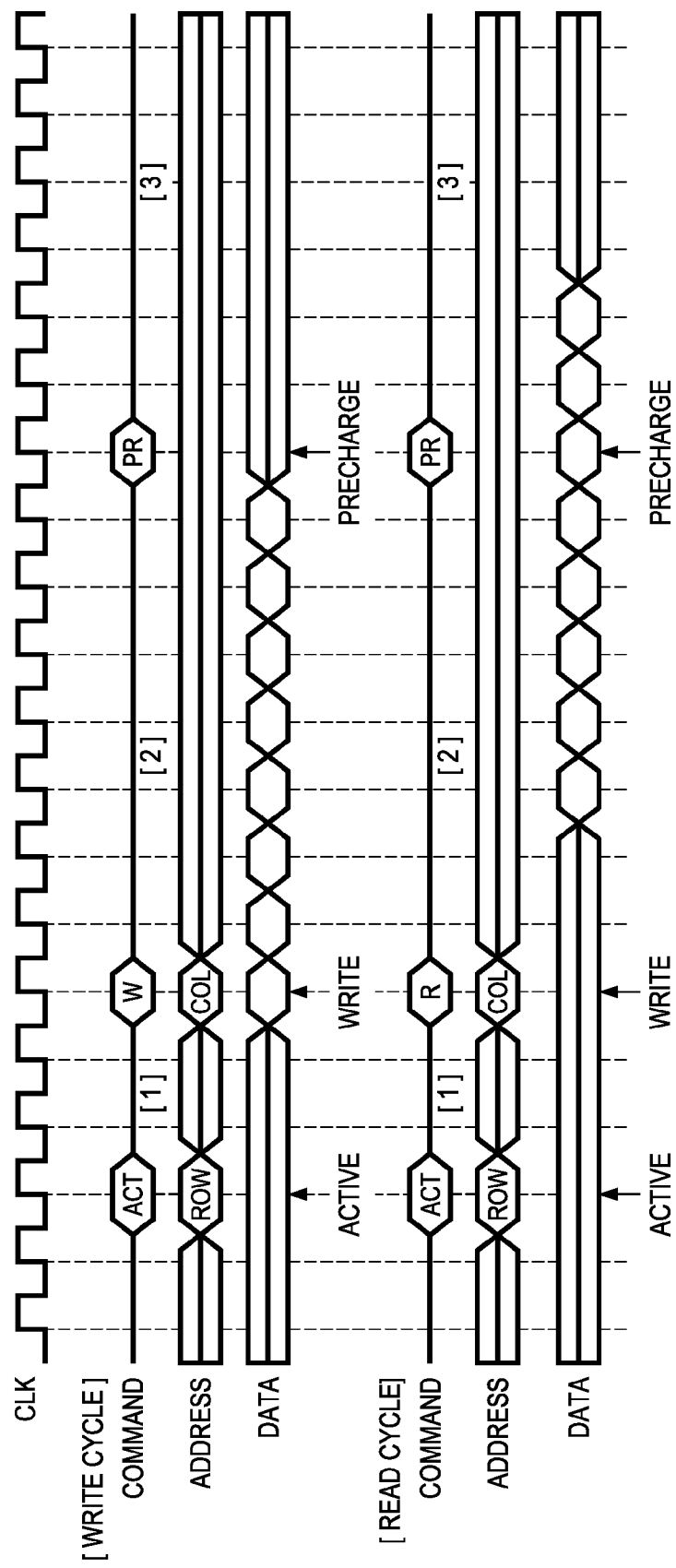
FIG. 2 is a timing diagram illustrating the basic operation of the memory access in an SDRAM (synchronous DRAM).

FIG. 2 is a diagram illustrating the basic operation of memory access in SDRAM 20. Here, SDRAM 20 has a constitution such that the data write operation and read operation are performed in synchronization with system clock CLK. As the system clock CLK, for example, a frequency of 133 MHz is adopted.

When data are written in SDRAM 20, first of all, active command ACT and row address ROW are given to SDRAM 20 simultaneously (fetching is performed upon the rising edge of clock CLK). Corresponding to active command ACT, SDRAM 20 switches from the hitherto idle state to the active state, and selects the memory cell group of the assigned row address of input row address ROW. Then, after a prescribed time, e.g., 3 clock cycles, write command W and column address COL are sent to SDRAM 20 simultaneously (fetched at the rising edge of clock CLK). As a result, in SDRAM 20, data write is performed continuously from the column address assigned by said column address COL in the column direction. This write operation is performed in synchronization with clock CLK, and the data in a preset burst length are input to SDRAM 20 from the data bus in units of two depending on the type of SDRAM 20, with one unit (1 byte or 1 word) for every clock CLK. At the time point of the end of the write operation, precharge command PR is sent to SDRAM 20. When the precharge command PR is input, SDRAM 20 enters the idle state.

Also when data are read from SDRAM 20, first of all, active command ACT and row address ROW are sent to SDRAM 20 simultaneously. Corresponding to said active command ACT, SDRAM 20 is switched from the hitherto idle state to the active state, and a memory cell group at the assigned row address of the input row address ROW is selected. Then, after a prescribed time, e.g., 3 clock cycles, read command R and column address COL are sent to SDRAM 20 simultaneously. Then, in SDRAM 20, data read is performed continuously from the column address assigned by column address COL in the column direction. This read operation is performed in synchronization with clock CLK, and data in a preset burst length are output from SDRAM 20 to the data bus in one unit (1 byte or 1 word) for every clock CLK after a preset time delay of CAS latency (a period of 3 clocks in this case). At the time point of the end of the read operation, precharge command PR is sent to SDRAM 20. After a delay time corresponding to CAS latency from the input of precharge command PR, SDRAM 20 becomes the idle state.

Figure 3:
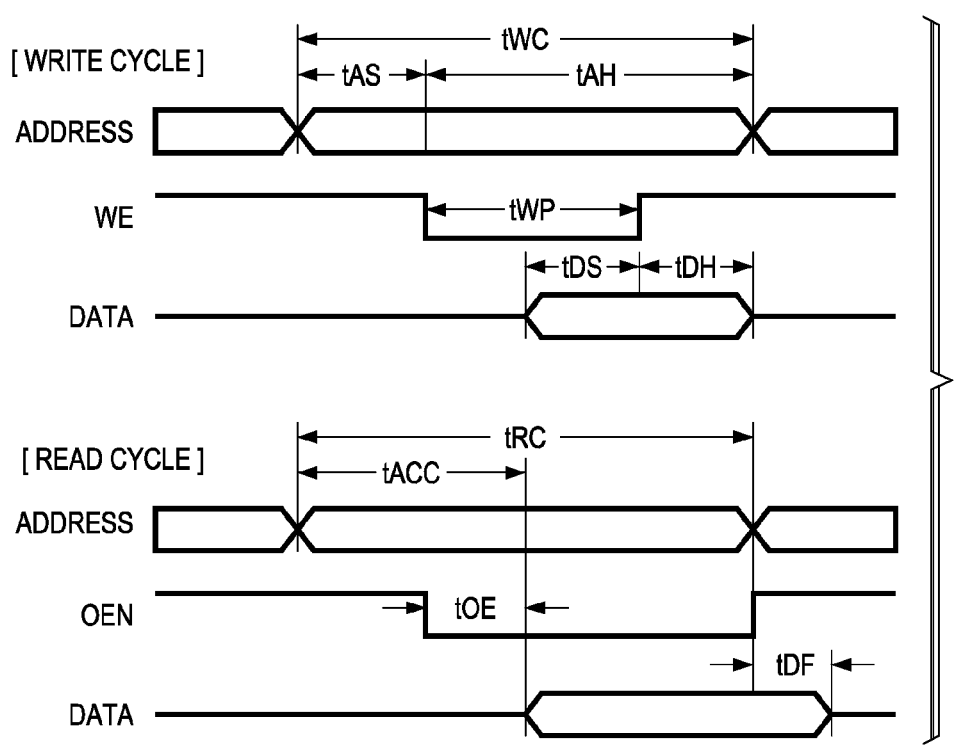
FIG. 3 is a timing diagram illustrating the basic operation of memory access in an FLASH (flash memory).

FIG. 3 is a diagram illustrating the basic operation of memory access in FLASH 22. FLASH 22 has a constitution such that write/read of asynchronous data independent of system clock CLK is performed. As shown in FIG. 3, after establishment of the input of the address given from the address bus, in the case of a write operation, the write data are input (latched) to FLASH 22 at the rising edge of a write enable signal, and, In the case of a read operation, an output enable signal is set at the L level, and data are output from FLASH 2.2. The read data are fetched to the side of the controller.

In this DVD driver, DFE 18 (especially shared bus controller 28), SDRAM 20 and FLASH 22 form the memory bus shared system of the present invention in the present embodiment. As explained above, the write/read of data with respect to SDRAM 20 and FLASH 22 is controlled unitarily by shared bus controller 28; SDRAM controller 32 accesses SDRAM 20 via shared bus controller 28, and MPU 24 accesses FLASH 22 via shared bus controller 28. In the prior art, as indicated by broken lines 46, 48 in FIG. 1, SDRAM controller 32 directly accesses SDRAM 20, and MPU 24 directly accesses FLASH 22. A part such as shared bus controller 28 is not present.

Figure 4:
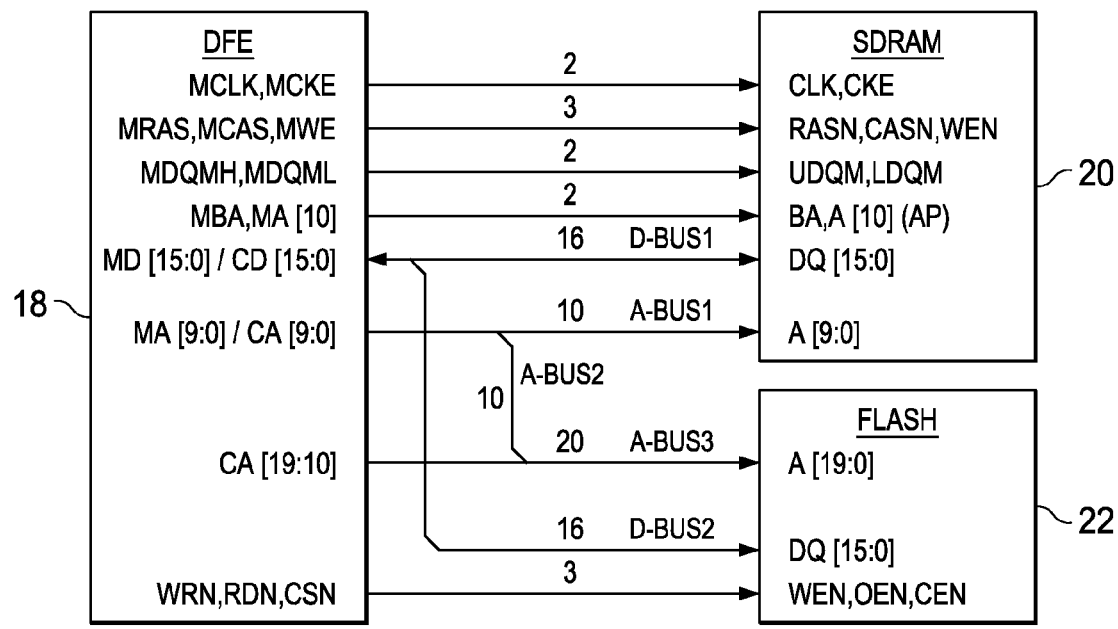
FIG. 4 is a diagram illustrating the connection state between DFE and SDRAM, FLASH in Embodiment 1.
Figure 6A:
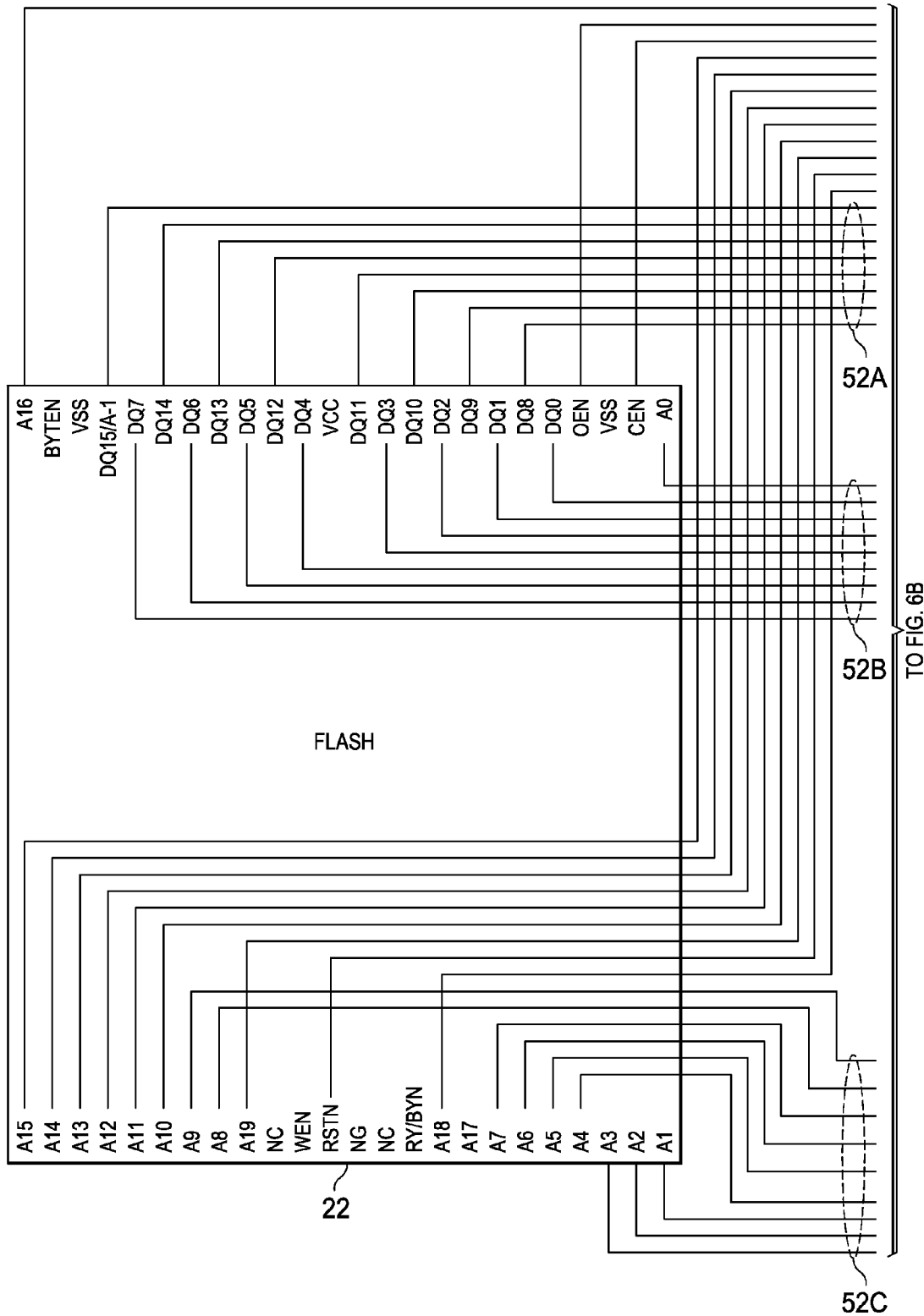
FIG. 6 is a diagram illustrating an example of the detailed pin configuration of DFE, SDRAM, FLASH (semiconductor package) and printed wiring in an embodiment.
Figure 6B:
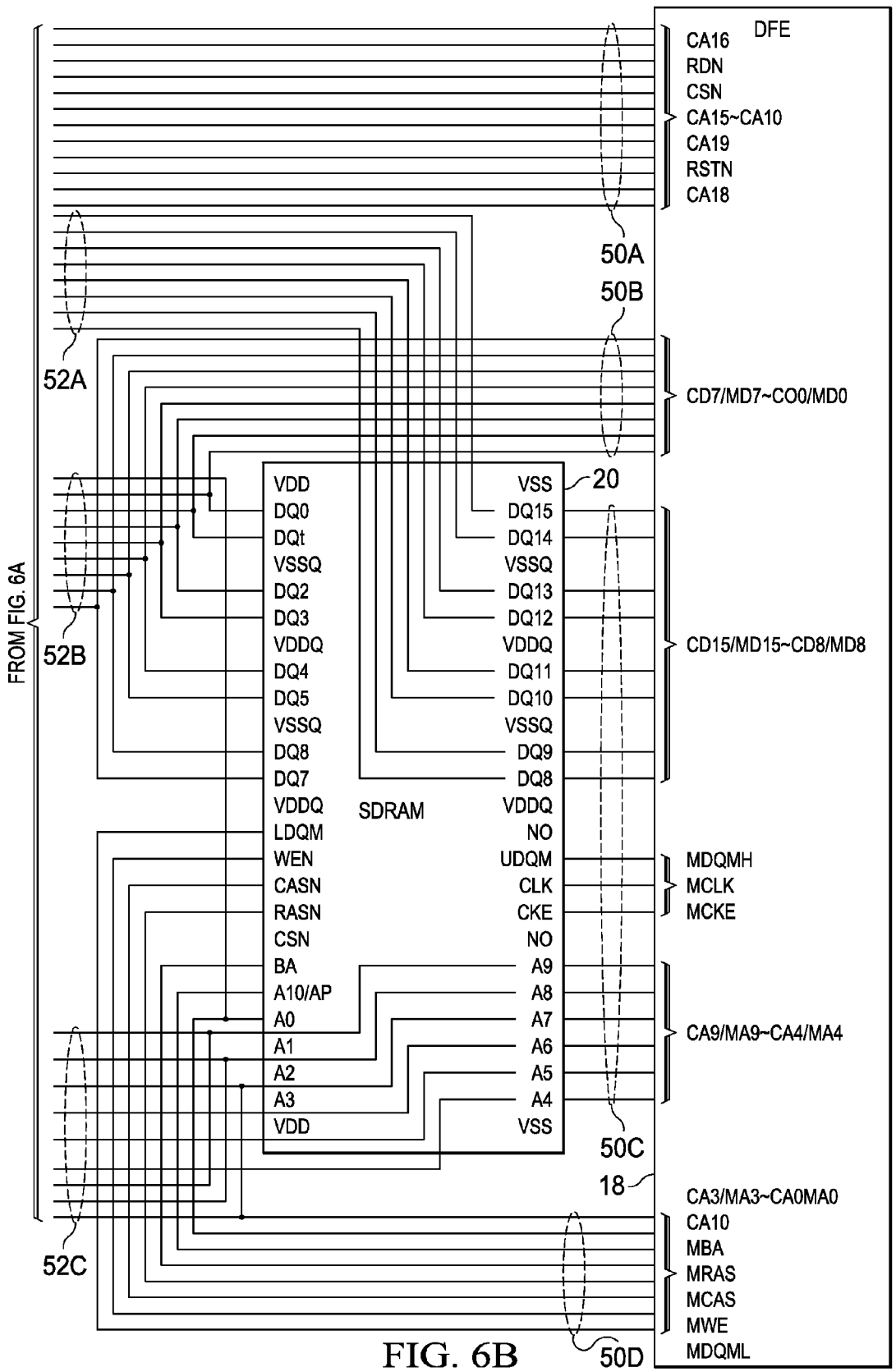

FIG. 4 is a diagram illustrating the state of connection between DFE 18 and SDRAM 20, FLASH 22 in the embodiment (Embodiment 1). FIG. 6 is a diagram illustrating the detailed pin configuration of said semiconductor packages 18, 20, 22 and an example of layout of the printed wiring. In FIG. 6, the printed board (not shown in the figure) having said semiconductor packages 18, 20, 22 assembled on it is made of a laminated wiring board containing wiring groups (50A), (50B), (50C), (50D) as a first layer of wiring, and wiring groups (52A), (52B), (52C) as a second layer of wiring.

As shown in FIG. 4, for DFE 18, MCLK represents a system clock output terminal, and MCKE represents a clock enable output terminal. They are respectively connected via individual control lines to clock input terminal CLK and clock enable input terminal CKE of SDRAM 20.

For DFE 18, MRAS represents a row address strobe output terminal, MCAS represents a column address strobe output terminal, and MWE represents a write enable output terminal. They are connected via individual control lines to row address strobe input terminal RASN, column address strobe input terminal CASN, and write enable input terminal WEN of SDRAM 20, respectively.

For DFE 18, MDQMH and MDQML represent data mask strobe output terminals, and they are connected via individual control lines to a data mask strobe input terminal of SDRAM 20.

For DFE 18, MBA represents a bank address terminal that is connected via an individual control line to bank address terminal BA of SDRAM 20. MA [10] of DFE 18 represents the 10$^{th}$ address terminal. Here, it is used as the precharge mode selection address terminal, and if is connected via an individual control line to corresponding terminal A[10] (AP) of SDRAM 20.

For DFE 18, MD [15:0]/CD [15:0] represent shared data terminals of 16 bits (1 word), and they are connected in parallel to data terminal DQ [15:0] of SDRAM 20 via data bus D-Bus 1, and, at the same time, they are connected in parallel to data terminal DQ [15:0] of FLASH 22 via data bus D-Bus 2.

For DFE 18, MA [9:0]/CA [9:0] represent shared address terminals of 10 bits, and they are connected in parallel to all address terminals A [9:0] of SDRAM 20 via address bus A-Bus 1, and, at the same time, they are connected in parallel via address bus A-Bus 2 to address terminal A [9:0] of the lower 10 bits of FLASH 22.

For DFE 18, CA [19:10] represents the address terminals of the upper 10 bits, and they are connected in parallel via address bus A-Bus 3 to address terminal A [19:0] of the upper 10 bits of FLASH 22. Between DFE 18 and FLASH 22, address bus A-Bus 2 and address bus A-Bus 3 merge to form an integrated address bus with a width of 20 bits.

For DFE 18, CSN represents a chip enable output terminal, RDM represents an output enable terminal, and WRN represents a write enable output terminal. They are connected via individual control lines to chip enable input terminal CEN, output enable terminal OEN, and write enable output terminal WRN of FLASH 22, respectively.

As explained above, in this embodiment (Embodiment 1), a portion [9:0] of address terminals A [19:0] of DFE 18 is connected commonly to address bus A-Bus 1 on the side of SDRAM 20 and address bus A-Bus 2 on the side of FLASH 22, and, at the same time, all data terminals D [15:0] of DFE 18 are connected commonly to data bus D-Bus 1 on the side of SDRAM 20 and data bus D-Bus 2 on the side of FLASH 22. That is, for DFE 18, SDRAM 20 and FLASH 22 share a portion of the address bus, and share all of the data bus. By means of said sharing of the address/data buses, in the embodiment shown in FIG. 4, while SDRAM 20 has 35 pins, and FLASH 22 has 39 pins, only 48 pins are needed for DFE 18 for allotment to said two memories 20, 22.

Figure 5:
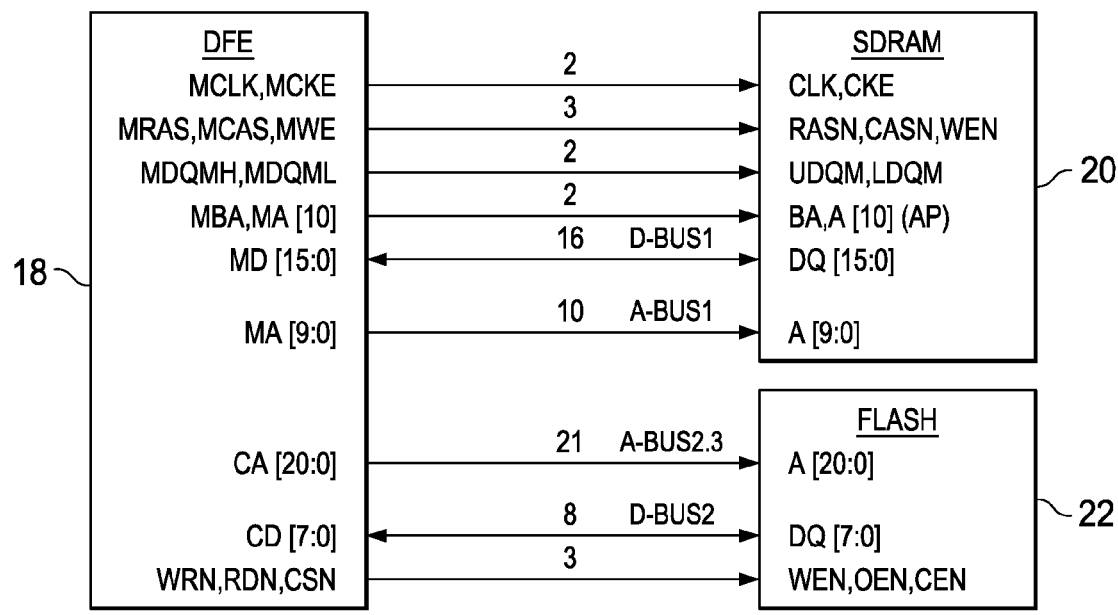
FIG. 5 is a diagram illustrating the state of connection between DFE and SDRAM, FLASH in the prior art.

As a comparative example, according to the prior art shown in FIG. 5, the constitution has SDRAM 20 and FLASH 22 connected to DFE 18. In the prior art, SDRAM 20 and FLASH 22 are completely connected to DFE 18 independently. That is, the address bus, data bus and control line are wired to each memory independently, and there is no shared portion between the two memories, in the example shown in the figure, SDRAM 20 has 35 pins, FLASH 22 has 32 pins, and DFE 18 has a total of 67 (35+32) pins allotted to said two memories 20, 22. Also, the data bus width of FLASH 22 is 8 bits (1 byte). This is to ensure that the pin number of DFE 18 is not further increased. That is, when the data bus width of FLASH 22 is 16 bites (1 word), the number of pins allotted to said two memories 20, 22 of DFE 18 is further increased by 7 to a total number of 74 pins.

In a system that has the address bus and data bus shared by SDRAM 20 and/or FLASH 22 as in said embodiment, it is necessary to avoid or eliminate competition when access is made to two memories 20, 22 simultaneously, and a special protocol is needed for avoiding access competition.

As aforementioned, for SDRAM 20, by means of burst transfer, continuous input/output of data in 1 unit (such as 1 word) for each clock in synchronization with clock CLK (133 MHz) is possible. On the other hand, for SDRAM 20, since the address is latched by clock, as a characteristic feature, the signal on the address bus can be ignored during the period other than said timing. Especially, as shown in FIG. 2, [2], during burst transfer, the address bus is not used, and, during the precharge period, neither the address bus nor the data bus is in use, and they are kept open.

For FLASH 22, the write/read cycle is relatively long, e.g., about 70 ns, and this corresponds to a clock CLK equivalent time of about 10 clock cycles. An especially long time is required for the period from input of an address to establishment, and, in the read operation, this address input establishment period tACC takes more than half~most of the read cycle (e.g., 7-9 clock cycles). Since the address input establishment period is long, in order to guarantee it, one seeks an access operation for output of an address to the address bus significantly quicker than the timing of output of data to the data bus.

In this embodiment, in consideration of the write/read cycle characteristics of said SDRAM 20 and FLASH 22, there is a protocol function for efficiently avoiding competition of memory access with respect to said two memories 20, 22 in shared bus controller 28 in DFE 18.

Figure 7:
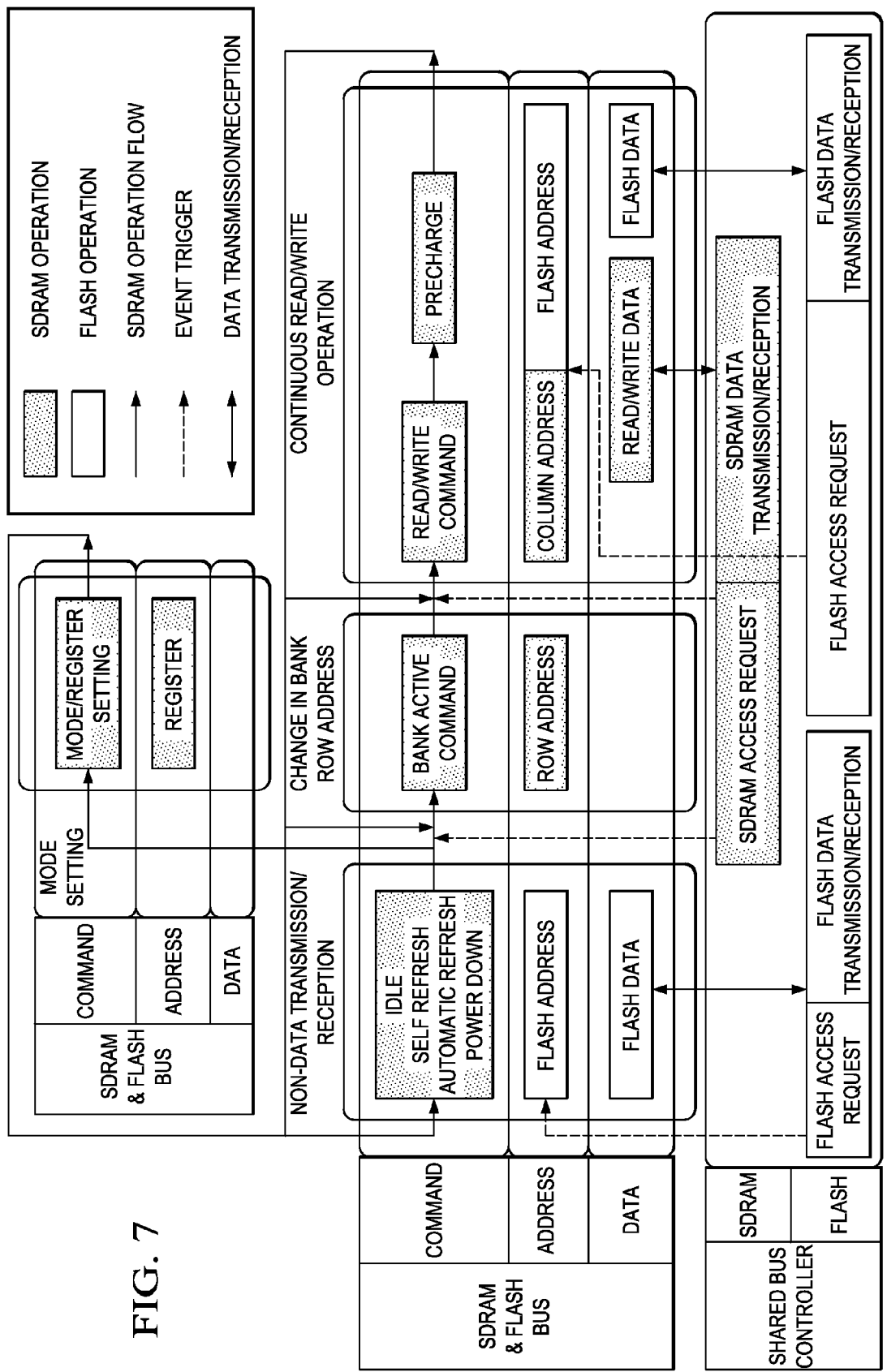
FIG. 7 is a schematic diagram illustrating the communication flow of memory access for SDRAM and FLASH in an embodiment.

FIG. 7 is a schematic diagram illustrating the communication flow of memory access to SDRAM 20 and FLASH 22 in this embodiment. As shown in the figure, for SDRAM 20, even during the period when transmission/reception (write/read) of data is not performed, execution of commands such as "idle", "self refresh", "automatic refresh", "power down", etc. is still possible. Said non-data transmission/reception type commands are defined by a combination of the logic of control signals MRAS, MCAS, MWE, MBA, MA [10], and they are sent from shared bus controller 28 via the control line to SDRAM 20. During the period of execution of a non-data transmission/reception type command by SDRAM 20, either address bus A-Bus 1 or data bus D-Bus 1 may be used. That is, for SDRAM 20, during the period of execution of a non-data transmission/reception type command, signals on address bus A-Bus 1 or data bus D-Bus 1 can be entirely ignored.

Here, in the present embodiment, during the period of execution of a non-data transmission/reception type command by SDRAM 20, on the side of DFE 18 (shared bus controller 28), memory access is requested for FLASH 22 at will via address bus A-Bus 1, data bus D-Bus 1 and control lines (WRN, RDM, CSN), and data write/read is performed.

Also, in SDRAM 20, by executing the command of "mode/register setting", it is possible to set the latency, burst length, etc. In this case, simultaneously with the command of "mode/register setting", setting values of the various parameters are sent through address bus A-Bus 1, and the setting values are stored in a mode register in SDRAM 20.

The basic type of operation for performing transmission/reception (write/read) of data in SDRAM 20 has the aforementioned sequence as shown in FIG. 2. That is, first of all, both the active command and the row address are sent to SDRAM 20 in the idle state, SDRAM 20 is switched from the idle state to the active state and the memory cell group at the row address assigned by the input row address ROW is selected. When SDRAM 20 is composed of two banks, the bank is assigned by 1 bit of MBA. Then, after a prescribed time, e.g., 3 clock cycles, the write/read command and the column address are sent to SDRAM 20 simultaneously. In the write operation, from this time point, data transfer is started with a preset burst length in synchronization with the clock, and, in the read operation, after the passage of the delay time of CAS latency, data transfer of the preset burst length in synchronization with the clock is started. This data transfer or transmission/reception is performed on data bus D-Bus 1. For SDRAM 20, when the column address is latched, subsequently, the signal on address bus A-Bus 1 is ignored (cutoff), and address bus A-Bus 1 is opened.

In this embodiment, when the column address is latched on SDRAM 20, immediately after that, it is preferred that memory access from the next clock cycle to FLASH 22 be started, and that shared bus controller 28 output the write/read address to FLASH 22 on the address bus (A-Bus 2, A-Bus 3). Then, after the end of data transfer of SDRAM 20 on data bus D-Bus 1, it is preferred that immediately after that, shared bus controller 28 output the write data to FLASH 22 (in the case of a write cycle), or that FLASH 22 output the read data by means of strobe signal RDN to data bus D-Bus 2 (in the case of a read cycle). Then, the input of address in FLASH 22 is established, and, when shared bus controller 28 asserts the strobe signal (WRN, RDN), either FLASH 22 fetches the write data on data bus D-Bus 2 (In the case of a write cycle), or shared bus controller 28 fetches the read data on data bus D-Bus 2 (in the case of a read cycle).

Figure 8:
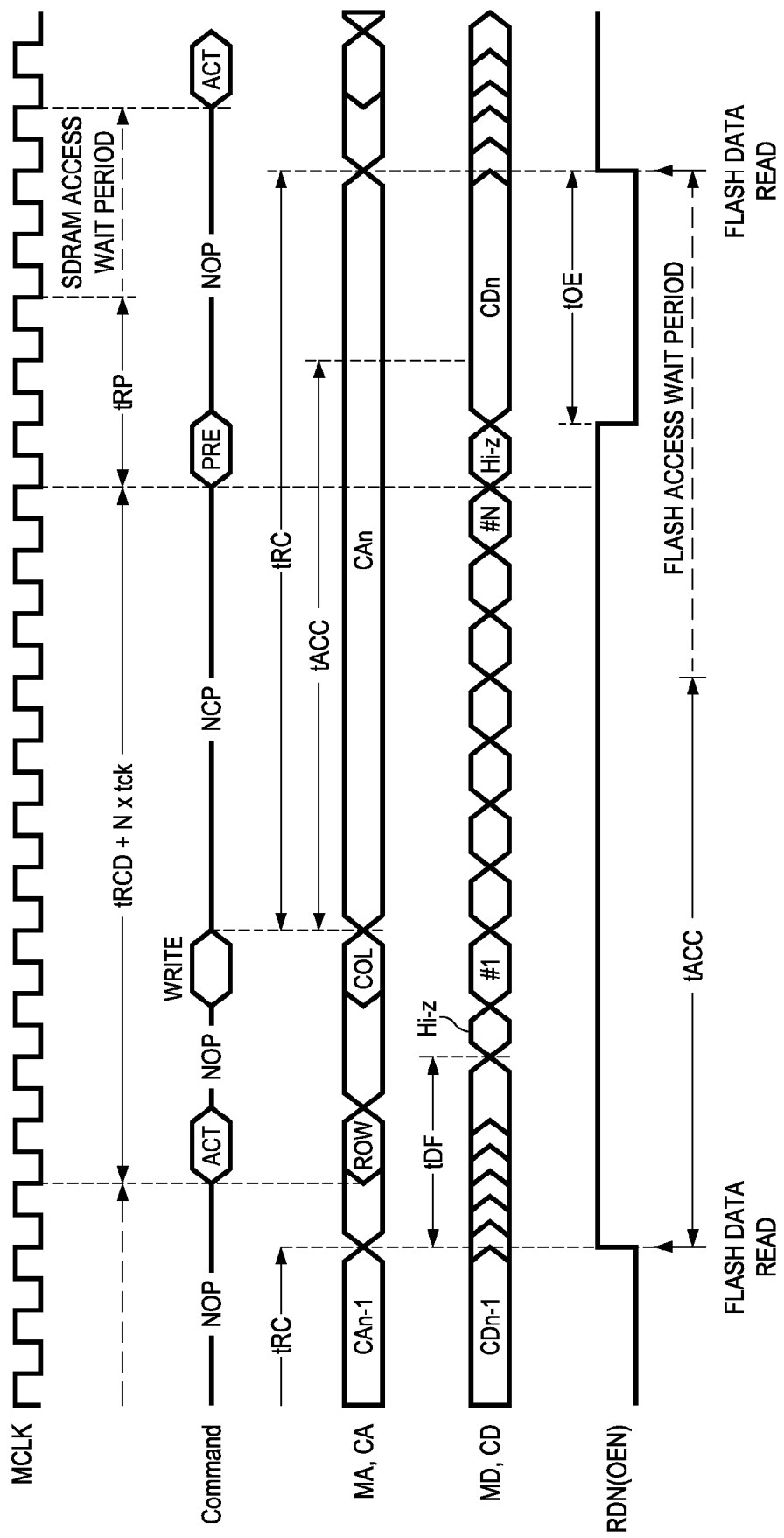
FIG. 8 is a timing diagram illustrating the protocol for avoiding competition between SDRAM write access and FLASH read access in an embodiment (Embodiment 1).

FIG. 8 is a timing diagram illustrating the protocol for avoiding competition between access to write to SDRAM 20 and access to read with respect to FLASH 22 in this embodiment (Embodiment 1). In the example shown in the figure, the burst length in SDRAM 20 is set at 8 words.

For shared bus controller 28, during the period when access to data transmission/reception with respect to SDRAM 20 is not performed, if there is an access request from MRU 24 to FLASH 22, it is executed immediately. When a request for data write to SDRAM 20 is received by SDRAM controller 32, and the shared bus is switched to the side of SDRAM 20, as a preferable scheme shown in FIG. 8, immediately after the end of transfer of the read data ($CD_{n-1}$) on the side of FLASH 22 on data bus D-Bus 2, all of the data buses are set in a high impedance state, and then transfer of write data (#1 . . . #N) on the side of SDRAM 20 on D-Bus 1 is started. Here, period tDF at the end of data transfer in FLASH 22 is the period from rise of output enable signal OEN on FLASH 22 to floating of data bus D-Bus 2 (unstable period).

Also, the following scheme is preferred: even if the shared bus is switched to the side of FLASH 22 after the end of the data access of SDRAM 20, immediately after the end of transfer of data (#1 . . . #N) on the side of SDRAM 20 on D-Bus 1, all of the data buses are set in a high impedance state, and transfer of the read data ($CD_n$) on the side of FLASH 22 on data bus D-Bus 2 is started.

As shown in FIG. 8, at a timing near the rising edge of strobe signal RDN, the data read from FLASH 22 to data bus D-Bus 2 are fetched into shared bus controller 28.

Figure 9:
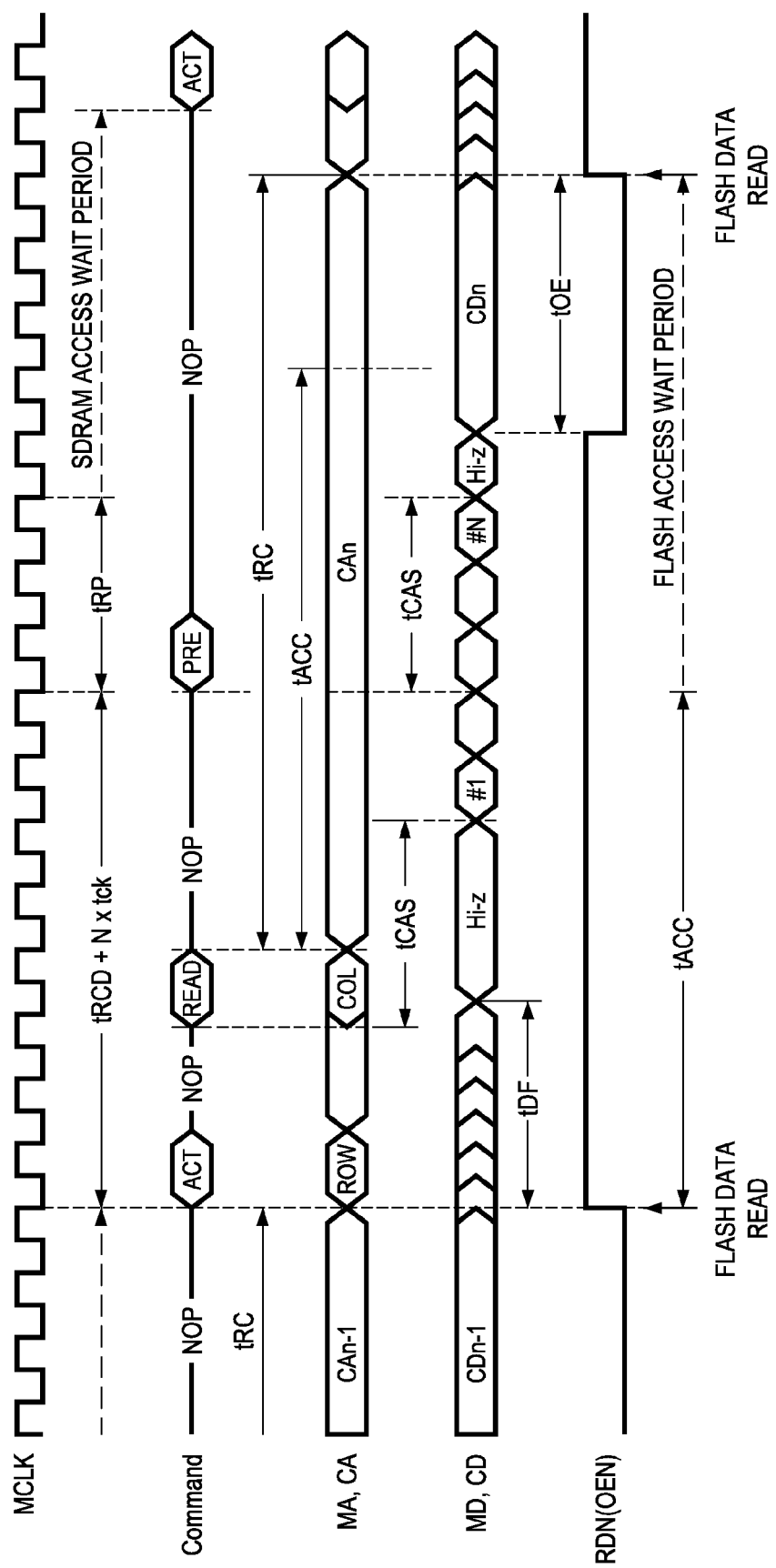
FIG. 9 is a timing diagram illustrating the protocol for avoiding competition between SDRAM write access and FLASH read access in an embodiment (Embodiment 1).

FIG. 9 is a timing diagram illustrating the protocol for avoiding competition between read access to SDRAM 20 and read access to FLASH 22 in this embodiment (Embodiment 1). In the example shown in the figure, CAS latency in SDRAM 20 is set at "3", and the burst length is set at "8 words". With the exception that the time of CAS latency is inserted in the period from the time when read command (READ) and column address (COL) are latched in the operation of SDRAM 20 to output of the read data to data bus D-Bus 1, the same sequence as that shown in FIG. 8 is adopted to avoid competition between the data access of SDRAM 20 and the data access of FLASH 22.

As shown in FIGS. 8 and 9, a wait time on memory access is generated in both SDRAM 20 and FLASH 22 due to sharing of the bus. However, as explained above, by means of bus sharing, the data width of FLASH 22 is expanded from 8 bits to 16 bits, and, based on this feature, an access margin may be set or evaluated.

Figure 10:
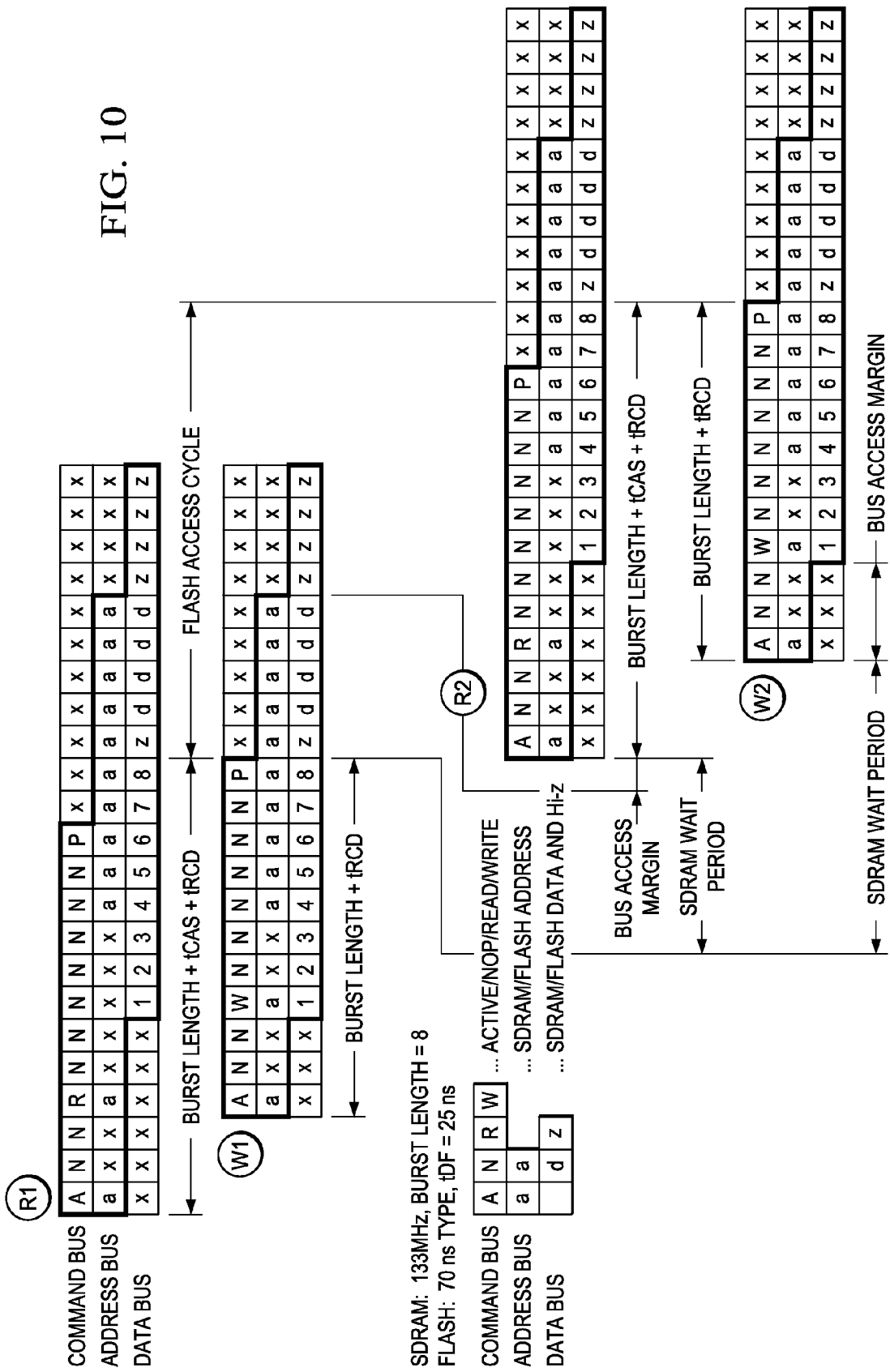
FIG. 10 is a diagram illustrating the access margin of buses if FLASH access is performed at a steady rate in an embodiment.

FIG. 10 is a diagram illustrating the access margin of the bus when the FLASH access is taken as a constant rate. [R1], [R2] are read operations of SDRAM 20, and [W1], [W2] are write operations. The portion defined by the wide line is a basic type block that has SDRAM 20 and FLASH 22 sharing the bus. Also, a small block (one division) that forms the basic type block corresponds to a period of clock CLK.

As shown in FIG. 10, when transition is performed from the operation of [R1] or [W1] to the operation of [R2], the duration (number of X portions) of the Don't Care portion between the former/rear 2 blocks of the address buses corresponds to the access margin of the bus, and it is 1 clock cycle in the example shown in the figure. Also, in the case of transition from the operation of [R1] or [W1] to the operation of [W2], the duration (number of X portions) of the Don't Care portion between the former/rear 2 blocks of the data buses corresponds to the access margin of the bus, and it is 3 clock cycles in the example shown in the figure.

If the designed transfer rate of FLASH 22 that receives access from MPU 24 is 13 MB/s, the FLASH access cycle=20 cycles. Under this condition, in consideration of the feature that the burst length of SDRAM 20 is extended by a portion corresponding to the access margin portion of the bus, in FIG. 10, in the pattern of transition from the operation of [R1] or [W1] to the operation of [R2], the burst length is extended by 1 clock cycle, that is, 1 word, and, In the pattern of transition from the operation of [R1] or [W1] to the operation of [W2], the burst length can be extended by 3 clock cycles, that is, 3 words, and the data transferability of SDRAM 20 is about 101-114 MB/s. This is a data transferability that allows sufficient operation on a current DVD driver.

Figures 11, 16:
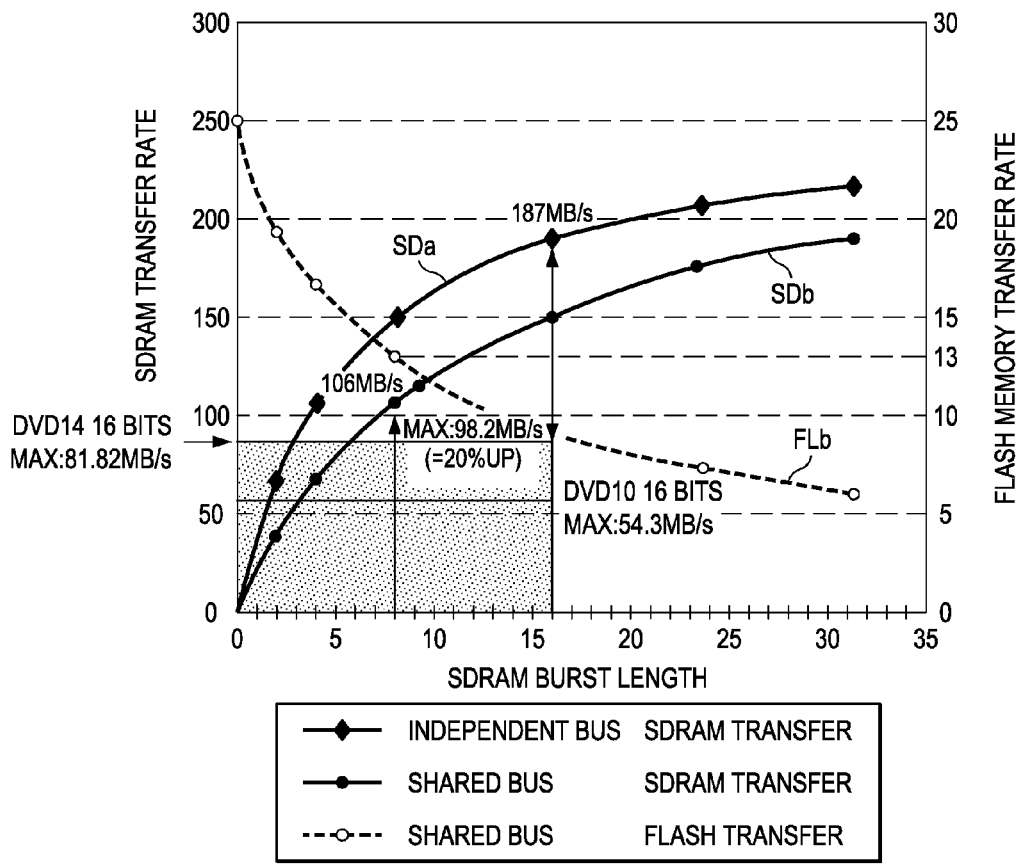
FIG. 11 is a diagram for which the burst length of SDRAM is taken as the variable of the abscissa, and in which the maximum transferability of SDRAM in the prior art and the maximum transferability of SDRAM, FLASH in the embodiment are compared with each other.
FIG. 16 is a table listing the various characteristics of Embodiments 1-3 as compared with the prior art.

In FIG. 11, the burst length of SDRAM is taken as the variable of the abscissa. The figure compares the maximum transferability SDa for a single body of SDRAM 20 in the prior art (FIG. 5) and the maximum transferability (ability of protocol) SDb and FLb of SDRAM 20 and FLASH 22 when access of SDRAM 20 and access of FLASH 22 are performed alternately in the bus shared system (FIG. 4) of the embodiment.

As shown in the figure, although the transfer rate of SDRAM 20 for the bus shared system SDb is a little lower than that for bus independent system SDa, at a burst length of 8 words, the SDRAM transfer rate of 106 MB/s and the FLASH transfer rate of 13 MB/s can be realized simultaneously, and it is possible to clear the transfer rate condition needed for practical application for both SDRAM 20 and FLASH 22. Also, the most significant feature is that the transfer efficiency (bus utilization efficiency) with the bus shared system can be significantly increased. As an example, it has been found that the transfer efficiency can be increased from 44% of the bus independent system to 85% of the bus shared system.

FIG. 11 is a diagram illustrating the specifications of the SDRAM transfer rate in DVD 10 and DVD 14 manufactured by Texas Instruments Japan Co., Ltd. as current typical DFE chips for DVD use. Said DVD 10 is designed to have a maximum burst length of the SDRAM of 16 words, and a maximum transfer rate of 54.3 MB/s. On the other hand, for DVD 14 of a higher rate, the maximum burst length of the SDRAM is designed to be 16 words, and the maximum transfer rate is 81.82 MB/s.

For the bus shared system in this embodiment, in order to guarantee a transfer rate (12.5 MB/s) similar to that when FLASH is independently accessed with 8 bits as in the prior art, it is necessary to suppress the burst length of the SDRAM transfer to about 10 words at most, and one may also adopt a scheme in which with the request for a 16-word burst transfer (specification), transfer is performed in two rounds with each as a burst transfer of 8 words, in this case, when an overhead of 5-20% appears in the SDRAM transfer, as the estimated overhead portion, the aforementioned maximum transfer rate of 81.82 MB is increased by 20% to 98.2 MB/s. However, according to the bus shared system of this embodiment, it is possible to realize a SDRAM transfer rate of 106 MB/s with a burst length of 8 words as shown in the figure. As a result, it is possible to cope with the requested performance with a margin.

In addition, instead of the aforementioned method in which FLASH 22 is read steadily at a fixed cycle, when SDRAM 20 is not bus accessed or when the burst length is short, one may also adopt a scheme in which by eliminating the access margin shown in FIG. 10, FLASH access (dynamic access) is performed even faster, and the weight for internal MRU 24 also can be reduced. In this case, the program may be constructed such that pre-read cache control of the FLASH data is performed, and processing of the fixed access inside MRU 24 is performed, or, even if dynamic access is performed, the system is still not impeded.

Also, as shown in FIG. 7, it is also possible that while the row address is fixed as is, the column address is successively renewed, and the read/write operation of SDRAM 20 is executed continuously, and it is possible to execute FLASH access in addition to SDRAM access in each round of a read/write cycle. For the sequence of a continuous read/write operation, although a detailed timing diagram is not shown, the operation for fetching of active command ACT and row address ROW in SDRAM 20 is omitted in FIGS. 8 and 9.

As shown in FIG. 6, for assembly on the printed board, while wiring can be made with the shortest distance as in the prior art even for a 2-layer substrate for connection from DFE 18 to SDRAM 20, connection from DFE 18 to FLASH 22 is estimated to be further extended to up to 40 mm. Also, the output frequency of the shared signal is 133 MHz/2=86.5 MHz or lower, and there is little concern regarding possible noise. Concerning the capacitive load, by means of bus sharing, there is also a capacitive load of FLASH 22 from the terminal of SDRAM 20, and, when further considering the capacitance of the wiring substrate, it is about 20 pF. From this capacitive load and the signal's output frequency (133 MHz/2=66.5 MHz), the driving ability on the side of DFE 18 is about 3 mA, and a specifically larger I/O buffer is not necessary.

Also, since the semiconductor package of DFE 18 is manufactured as a QFP (Quad Flat Package) with a lower pin number, it is possible to suppress the cost of the substrate and the assembly cost, and, at the same time, the pins can be probed immediately, so that the debugging efficiency can be higher than that of a BGA (Bail Grid Array).

In said Embodiment 1 (FIG. 4), both the address bus and the data bus are shared by SDRAM 20 and FLASH 22. However, as shown in FIGS. 12 and 13, one may also adopt a bus shared system with only the address bus shared, and with the data bus held individually or independently.

Figure 12:
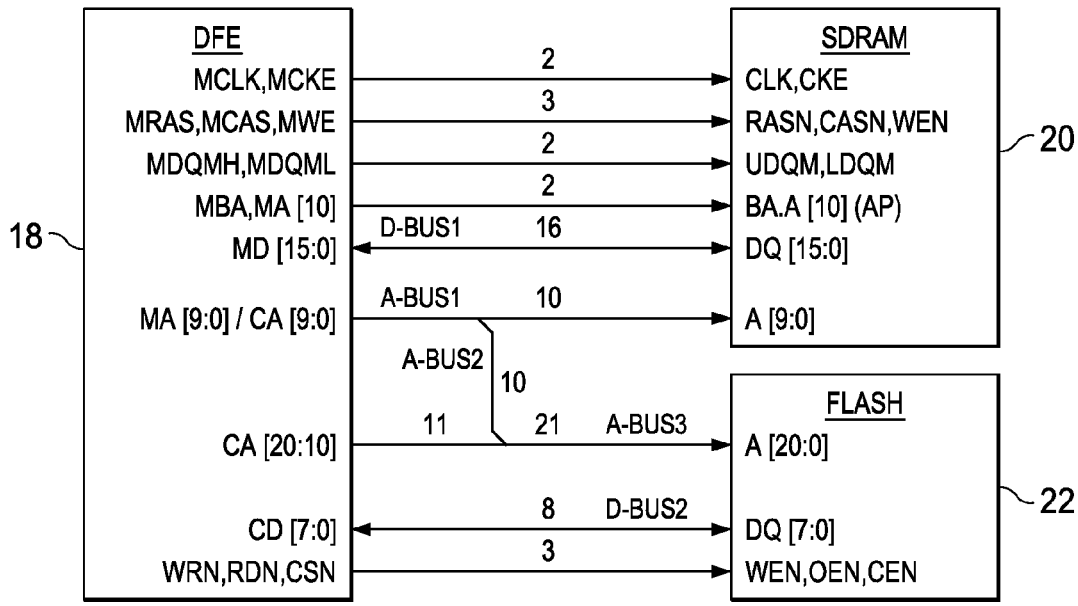
FIG. 12 is a diagram illustrating the state of connection between DFE and SDRAM, FLASH in Embodiment 2.

In Embodiment 2 shown in FIG. 12, the data of FLASH 22 have an 8-bit configuration, and the address has a 21-bit configuration. More specifically, data terminals D [15:0] of 16 bits of SDRAM 20 are connected to MD terminals [15:0] of 16 bits of DFE 18 via data bus D-Bus 1 with a width of 16 bits, and the 10-bit address terminals A [9:0] of SDRAM 20 are connected to 10-bit address terminals MA [9:0] of DFE 18 via 10-bit-width address bus A-Bus 1. Also, the 21-bit address terminals A [20:0] of FLASH 22 are connected via 10-bit address bus A-Bus 2 and 11-bit address bus A-Bus 3 to 10-bit address terminals CA [9:0] and 11-bit address terminals CA [20:10] of DFE 18. Here, In DFE 18, address terminals CA [9:0] and address terminals MA [9:0] are identical to each other. Also, the 8-bit data terminals DQ [7:0] of FLASH 22 are connected to 8-bit data terminals CD [7:0] of DFE 18 via 8-bit data bus D-Bus 2.

As explained above, in this Embodiment 2, a portion [9:0] of address terminals A [19:0] of DFE 18 is connected commonly to address bus A-Bus 1 on the side of SDRAM 20 and address bus A-Bus 2 on the side of FLASH 22. By sharing this address bus, with 35 pins of SDRAM 20 and 32 pins of FLASH 22, the number of pins of DFE 18 allotted to two memories 20, 22 is 57.

Figure 13:
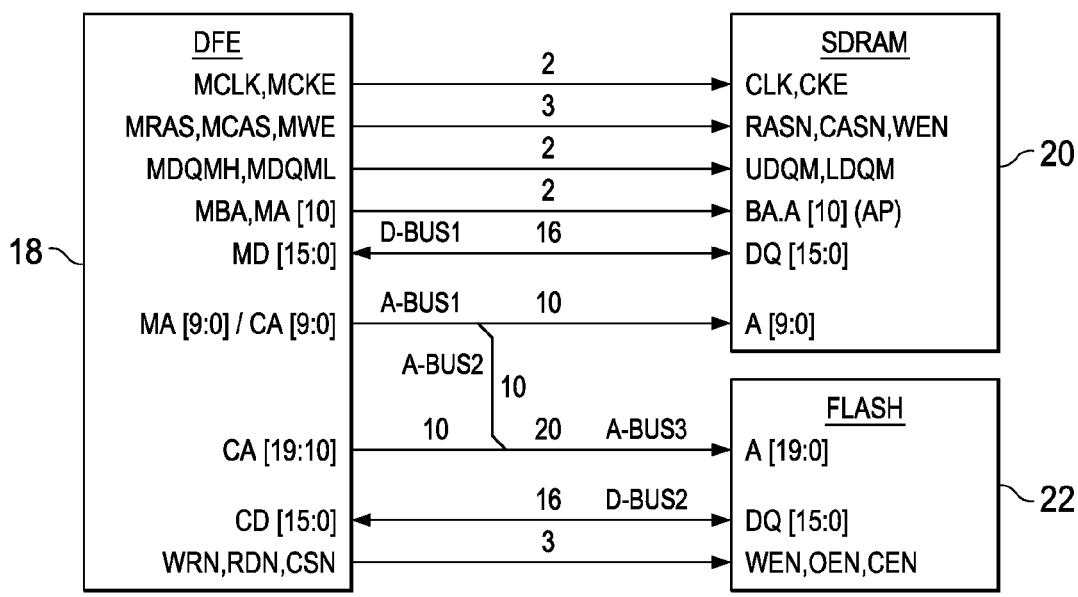
FIG. 13 is a diagram illustrating the state of connection between DFE and SDRAM, FLASH in Embodiment 3.

In Embodiment 3 shown in FIG. 13, the data of FLASH 22 are composed of 18 bits, and the address is composed of 20 bits. More specifically, SDRAM 20 is connected to DFE 18 in the same constitution as that of said Embodiment 2 (FIG. 12). For FLASH 22, 20-bit address terminals A [19:0] are connected via 10-bit address bus A-Bus 2 and 10-bit address bus A-Bus 3 to 10-bit address terminals CA [9:0] and 10-bit address terminals CA [19:10] of DFE 18. Here, in DFE 18, address terminals CA [9:0] and address terminals MA [9:0] are the same terminals. Also, 16-bit data terminals DQ [15:0] of FLASH 22 are connected via 16-bit data bus D-Bus 2 to 16-bit data terminals CD [15:0] of DFE 18.

Also in said Embodiment 3, a portion [9:0] of address terminals A [19:0] of DFE 18 is connected commonly to address bus A-Bus 1 on the side of SDRAM 20 and address bus A-Bus 2 on the side FLASH 22. By means of this address bus sharing scheme, for SDRAM 20 with 35 pins and FLASH 22 with 32 pins, DFE 18 has 64 pins for allotting to two memories 20, 22.

Figure 14:
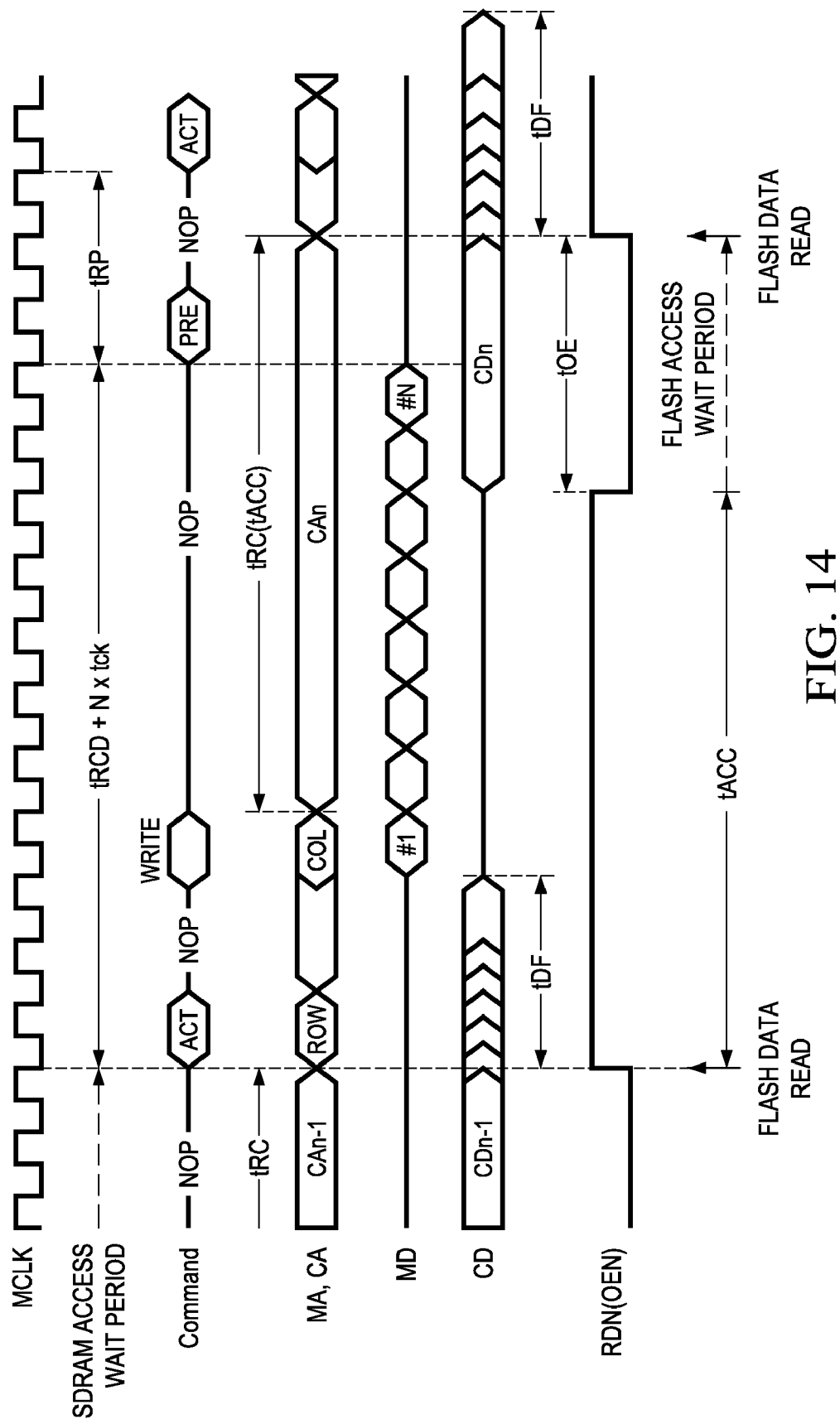
FIG. 14 is a timing chart illustrating the protocol for avoiding competition between SDRAM write access and FLASH read access in the bus shared system in Embodiments 2, 3.
Figure 15:
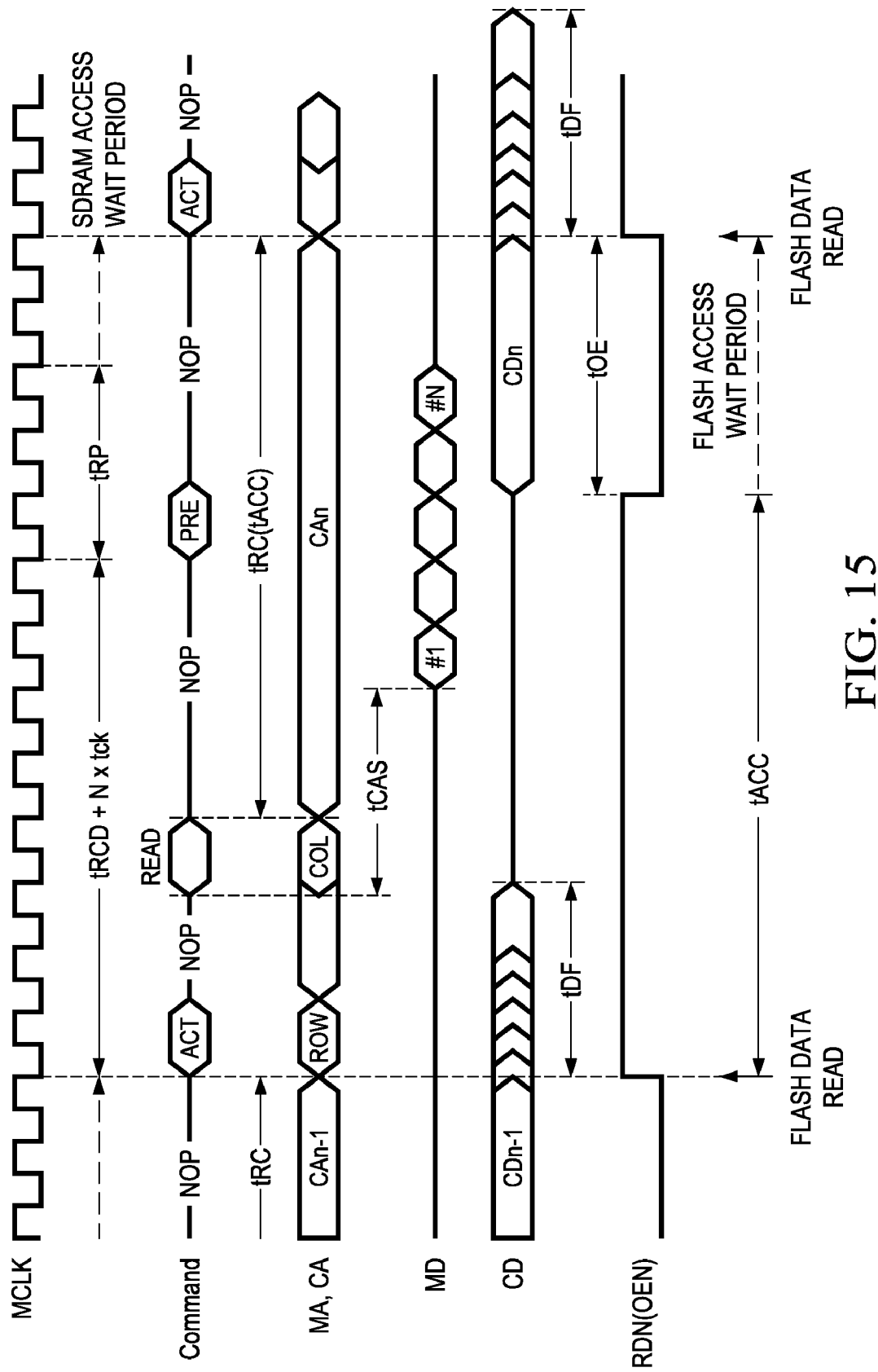
FIG. 15 is a timing chart illustrating the protocol for avoiding competition between SDRAM read access and FLASH read access in the bus shared system in Embodiments 2, 3.

FIGS. 14 and 15 are timing diagrams illustrating the protocol for avoiding competition between access of SDRAM 20 and access of FLASH 22 in the bus shared system in Embodiments 2 and 3. FIG. 14 is a diagram illustrating write access as the access of SDRAM 20, and read access as the access to FLASH 22. As shown in FIG. 15, the access to SDRAM 20 is read access, and the access to FLASH 22 is the read access.

As shown in the figures, from before the end of transfer of the write data (#1 . . . #N) on the side of SDRAM 20 on data bus D-Bus 1, it is possible to output the data read to data bus D-Bus 2 from FLASH 22. As a result, the access competition becomes smaller, and it is possible to assert the strobe signal RDN (OEN) of read quickly and to shorten the FLASH access cycle. Consequently, in Embodiment 3 (FIG. 13) with a 16-bit structure for FLASH 22, it is possible to further increase the data transfer rate of FLASH 22. However, in Embodiment 2 (FIG. 12) with an 8-bit structure for FLASH 22, the data transfer rate of FLASH 22 is half that in Embodiment 3. For the FLASH data transfer rate, compared with the prior art (FIG. 5), the simulation results indicate about 1.52 times in Embodiment 1 (FIG. 4), about 1.84 times in Embodiment 2, and about 0.92 times in Embodiment 3.

FIG. 16 summarizes the various characteristics of Embodiments 1, 2, and 3 as compared with the prior art (FIG. 5). In the embodiments, especially in Embodiment 3, the pin number of DFE 18 is reduced by 19 as compared to that of the prior art, the SDRAM transfer efficiency is improved from 44% of the prior art to 87%, and the FLASH transfer rate is improved to 1.52 times that of the prior art.

Figure 17:
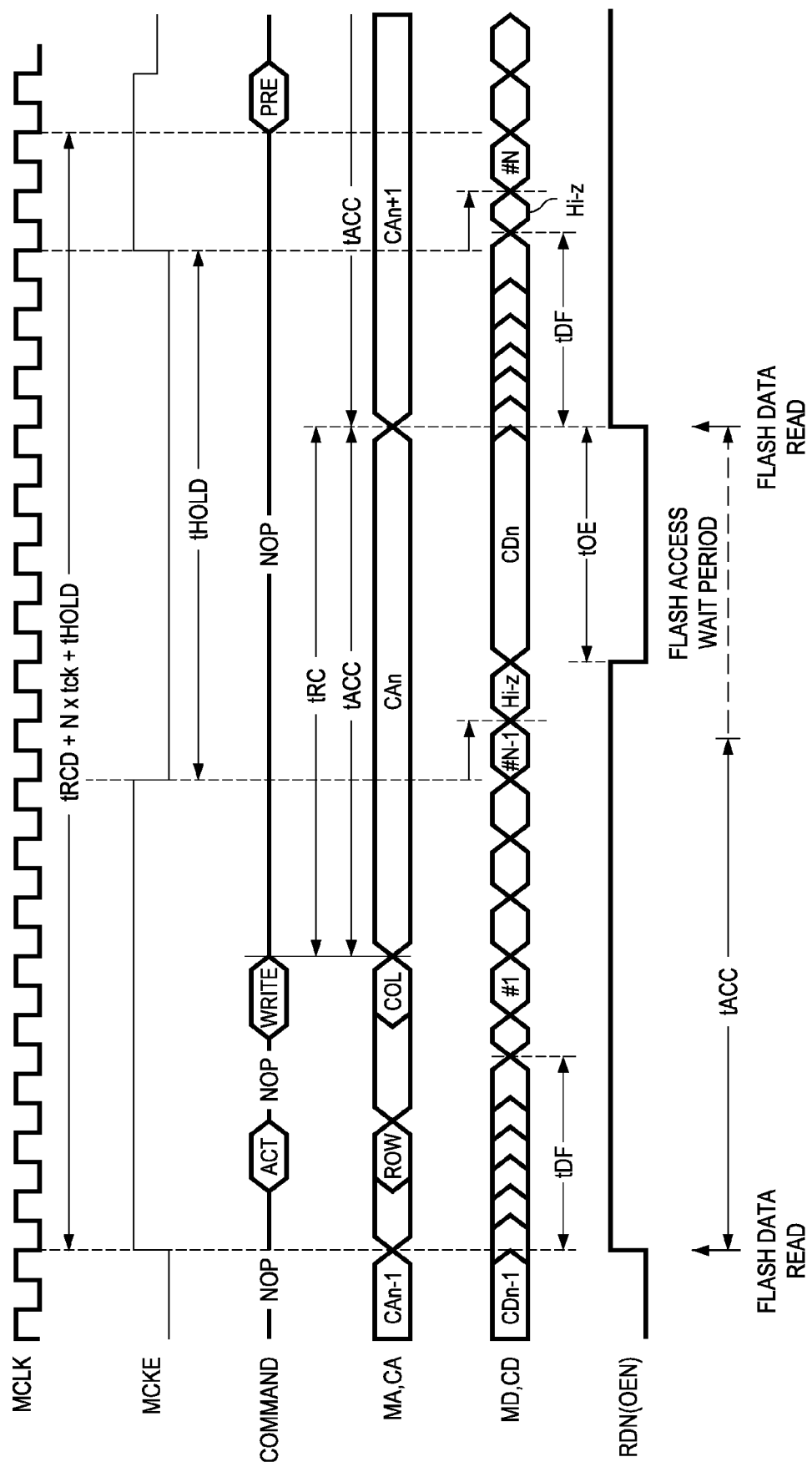
FIG. 17 is a timing chart illustrating the protocol for avoiding competition between SDRAM read access and FLASH read access in the bus shared system in Embodiment 1.

FIG. 17 is a diagram illustrating a method of control using clock enable signal CKE for increasing the transfer efficiency of the FLASH data, as a modified example of embodiment. Concerning the operation, after the address of FLASH 22 is established during the period of FLASH read cycle CAn after issuing of a write command (Write) with respect to SDRAM 20, clock enable signal CKE with respect to SDRAM 20 is negated such that the FLASH data can be accessed immediately after that, and the write operation of SDRAM 20 is temporarily paused. During the write operation pause period, in order to enable disabling (changing to high impedance) of the data output from DFE 18 to SDRAM 20, data access on the side of FLASH 22 is performed. Then, after the end of access of FLASH 22, the write operation of SDRAM 20 is restarted.

In the read operation of SDRAM 20, because it is impossible to realize a high impedance for the bus without masking the SDRAM data, pause by said clock enable signal CKE cannot be performed. As another option, the following scheme may be adopted: the read operation of SDRAM 20 is terminated at an intermediate point, and access on the side of FLASH 22 is performed; then, the read command is sent again to SDRAM 22, and data are continued.

As an application scheme of Embodiment 1, one may also adopt a scheme in which data are directly fetched between SDRAM 20 and FLASH 22. That is, in addition to the effect of reduction of pins, another advantage of bus sharing is as follows: by exploiting the feature that the data buses are connected between SDRAM 20 and FLASH 22, by operating the control signal on hardware instead of going through DFE 18, it is possible to perform transmission/reception of the data signal of SDRAM 20 and FLASH 22.

In Embodiment 1, as precharge command (PRE) is used, in order to avoid competition with the address bus of FLASH 22, the pins of MBA, MA [10] for SDRAM 20 do not share the bus. However, for a system using an auto precharge command, in order to avoid competition, these pins also can be shared. In addition, bus sharing can be performed by combining the control pins (MCAS, MRAS, MWE) of SDRAM 20 with control of chip select pin MCS or other combinations of intervals [1], [2], [3] shown in FIG. 2.

In the bus shared system of the present invention, for the SDR (Single Data Rate)-SDRAM, because it has the same I/O level as that of the general purpose FLASH, the bus shared system itself has nearly the same operation commands even in DDR (Double Data Rate)-SDRAM, Mobile type SDRAM, so that they are effective in the same way. Also, in addition to application on a printed board, it may also be adopted if SDRAM and buses are shared on a package having plural chips of SIP (silicon in package) and PoP (package on package), etc. Also, bus sharing with SDRAM may be adopted in addition to FLASH, and also if general purpose I/O is added by adding an externally attached circuit, and by outputting the internal signal on a regular basis, etc. In addition, the nonvolatile memory in the present invention is not limited to flash memory, and one may also use FeRAM, etc.

Also, in DFE 18, by cutting the pin number in SDRAM 20 and FLASH 22, it is possible to distribute the cut portion to other pins, such as those for digital signals, analog peripheral pins, power pins, and it is possible to guarantee a degree of freedom of the architecture. As a result, even if AFE 16 and DFE 18 are integrated, it is still possible to realize them in a small package.

The aforementioned embodiments pertain to a DVD driver. However, the bus shared system of SDRAM and nonvolatile memory of the present invention may also be adopted in other chip sets, such as AV encode/decode chips, graphic processing chips, HDD (Hard Disk Drive) signal processing chips, etc.

The invention claimed is:

1. A type of memory bus shared system comprising:
a first memory that performs data write/read in synchronization with a clock,
a second memory that performs data write/read asynchronously and independent of a clock,
a controller that accesses said first and second memories and controls data write/read,
a first address bus that connects said controller and said first memory for address assignment,
a first data bus that connects said controller and said first memory for data transfer,
a first control line that connects said controller and said first memory for memory control,
a second address bus that connects said controller and said second memory for address assignment,
a second data bus that connects said controller and said second memory for data transfer, and
a second control line that connects said controller and said second memory for memory control;
while a portion or all of the address terminals of said controller are connected commonly to said first and second address buses, a portion or all of the data terminals of said controller are connected commonly to said first and second data buses;
said controller performs the following operation: when access to said first memory and access to said second memory compete with each other, after a first address sent to said first address bus is fetched to said first memory, a second address is sent to said second address bus; on said first data bus, data transfer with said first memory is terminated; and, after establishment of the input of second address in said second memory, data transfer is performed with said second memory on said second data bus.

2. The memory bus shared system described in claim 1 characterized by the fact that said first memory, said second memory and said controller are carried on individual semiconductor chips, respectively, and are assembled on the same substrate or in a package.

3. The memory bus shared system described in claim 1 characterized by the fact that said first memory is a synchronous DRAM.

4. The memory bus shared system described in claim 3 characterized by the tact that said controller performs the following operation: when data are written in said synchronous DRAM in the idle state, at a first time point, an active command and a desired row address are simultaneously sent to said first control line and said first address bus, respectively; then, at a second time point after the passage of a prescribed time since said first time point, a write command and a desired column address are simultaneously sent to said first control line and said first address bus, respectively; and data with a prescribed burst length from said second time point are sent to said first data bus in synchronization with a clock.

5. The memory bus shared system described in claim 4 characterized by the fact that said controller sends a precharge command to said first control line at a third time point after the passage of a prescribed time corresponding to said burst length from said second time point.

6. The memory bus shared system described in claim 3 characterized by the fact that said controller performs the following operation: when data are read from said synchronous DRAM in the idle state, at a first time point, an active command and a desired row address are simultaneously sent to said first control line and said first address bus, respectively; then, at a second time point after the passage of a prescribed time since said first time point, a read command and a desired column address are simultaneously sent to said first control line and said first address bus, respectively; and, from a third time point after the passage of a preset period of CAS latency from said second time point, data with a preset burst length are fetched from said first data bus in synchronization with a clock.

7. The memory bus shared system described in claim 6 characterized by the fact that at a fourth time point after the passage of a prescribed time from said third time point, said controller sends a precharge command to said first control line.

8. The memory bus shared system described in claim 3 characterized by the fact that said controller performs the following operation: during a period when a command not in company with the use of said first address bus and said data bus is sent via said first control line to said synchronous DRAM and said command is executed in said synchronous DRAM, write/read is performed for any data with respect to said second memory via said second address bus, said second data bus, and said second control line.

9. The memory bus shared system described in claim 3 characterized by the fact that said second memory is a nonvolatile memory.

10. The memory bus shared system described in claim 9 characterized by the fact that said controller performs the following operation: after the end of data transfer to said first data bus, the data written on said second data bus are output; then, a strobe signal for write is output to write said data to said nonvolatile memory.

11. The memory bus shared system described in claim 10 characterized by the fact that said controller performs the following operation: after the end of data transfer to said first data bus, a strobe signal for read is output, the data read on said nonvolatile memory are output to said second data bus, and said read data are fetched from said second data bus.

12. The memory bus shared system described in claim 10 characterized by the fact that said controller performs the following operation: immediately after the end of data transfer on said first data bus, said first and second data buses are set in a high impedance state, and then data transmission/reception is performed on said second data bus.

13. A type of memory bus shared system comprising:
- a synchronous DRAM that performs data write/read in synchronization with a clock,
- a flash memory that performs data write/read asynchronously and independent of a clock,
- a controller that accesses said synchronous DRAM and said flash memory and controls data write/read,
- a first address bus that connects said controller and said synchronous DRAM for address assignment,
- a first data bus that connects said controller and said synchronous DRAM for data transfer,
- a first control line that connects said controller and said synchronous DRAM for memory control,
- a second address bus that connects said controller and said flash memory for address assignment,
- a second data bus that connects said controller and said flash memory for data transfer, and
- a second control line that connects said controller and said flash memory for memory control;
- a portion or all of the address terminals of said controller are connected commonly to said first and second address buses, while a portion or all of the data terminals of said controller are connected commonly to said first and second data buses;

said controller performs the following operation: when access to said synchronous DRAM and access to said flash memory compete with each other, after a first address sent to said first address bus is fetched to said synchronous DRAM, a second address on said second address bus is sent out; from the time point when data transfer in a first burst length corresponding to a portion of the desired write data or read data on said first data bus comes to an end, the memory access operation with respect to said synchronous DRAM is stopped, and instead of this, on said second data bus, data transfer with said flash memory is performed; then, the memory access operation with respect to said synchronous DRAM is restarted, and data transfer of a second burst length corresponding to the remainder of said write data or read data is performed.

* * * * *